United States Patent Office 2,827,445
Patented Mar. 18, 1958

2,827,445

PURIFICATION OF POLYMERIZED OLEFINS PREPARED WITH CATALYTIC METAL COMPOUNDS

Frank A. Bartolomeo and Harvey D. Ledbetter, Lake Jackson, and James M. McDuff, Angleton, Tex., assignors to The Dow Chemical Company, Midland, Mich., a corporation of Delaware No Drawing. Application September 16, 1955
Serial No. 534,871

14 Claims. (Cl. 260—94.9)

This invention relates to a method for treating polymerized olefinic and other ethylenically unsaturated materials which have been prepared with catalytic heavy metal compounds to improve their characteristics, particularly with regard to darkening and degradation, during subsequent shaping and forming operations and upon exposure to light. In particular, it relates to a method for removing catalyst residues from such products.

Various olefins and other ethylenically unsaturated materials, particularly ethylene, may be efficiently polymerized, even as relatively impure materials, to relatively high molecular weight polymeric compounds at relatively low pressures and temperatures, according to a process first proposed by Karl Ziegler and his associates in Germany. In this process mixtures of strong reducing agents such as aluminum alkyls with compounds of group IV–B, V–B and VI–B metals of the periodic system including thorium and uranium are employed as catalysts for the polymerization. Polyethylenes, for example, having average molecular weights in excess of 50,000 and as large as 100,000 to 3,000,000 can be manufactured by polymerizing ethylene gas with such catalysts at temperatures beneath about 100° C. and under pressures less than about 100 atmospheres. It is preferable when employing such catalysts according to the Ziegler process to operate at temperatures of about 50° C. and under pressures between about 1 and 10 atmospheres. The reaction may suitably be conducted in the presence of an organic solvent such as hexane, benzene and the like.

The polyethylenes prepared by the Ziegler process have superior and highly desirable properties. For example, they may be made containing less than 3 and even less than 0.03 methyl group per 100 methylene groups in the polymer molecule. The polymer molecules are practically completely linear and are crystalline almost to their melting points, which usually are in excess of 130° C. They are insoluble in most solvents at ordinary temperatures. Shaped articles formed with such polyethylenes have tear strengths between about 1400 and 2800 pounds per square inch. Unstretched films prepared from them have tensile strengths in excess of about 2800 pounds per square inch and may be oriented by stretching to polyethylene film structures having tensile strengths as high as about 42,500 pounds per square inch.

The strong reducing agents which are advantageously employed in the catalyst mixtures of the Ziegler process include among other compounds, a variety of aluminum trialkyls such as aluminum trimethyl, aluminum triethyl, aluminum tripropyl, aluminum triisobutyl and higher aluminum trialkyls as well as dialkyl aluminum halides and dialkyl aluminum hydrides. Salts of titanium, zirconium, uranium, thorium and chromium are preferably employed as the group IV–B, V–B and VI–B metallic compounds in the catalyst although salts of the remaining metals in these subgroups may also be employed. Compounds of these metals including their halogenides, oxyhalogenides, complex halogenides, freshly precipitated oxides and hydroxides and such organic compounds as alcoholates, acetates, benzoates, acetyl acetonates and the like may be used in the catalyst.

A particularly active catalyst mixture for the Ziegler process may be obtained by mixing a titanium or zirconium compound, such as a tetrachloride, oxychloride or acetyl acetonate with the reducing agent such as an aluminum alkyl. Amounts of the catalyst admixture varying from 0.01 to a few percent by weight, depending upon the degree of purity of the materials being polymerized may suitably be employed.

After polymerization according to the Ziegler process, however, polyethylene and similar polymerized products contain catalytically active residues from the admixed metallic catalyst employed. The residues are usually not removed to less than about 50 p. p. m. by weight by the conventionally utilized purification aftertreatments of polymeric materials prepared according to the Ziegler process. Such aftertreatment may involve filtration, preferably in the presence of air (which tends to lighten the color of the product), to separate the polymerization product from the reaction mass. This may be followed by sequential trituration with hexane, isopropanol or water, acetone and pentane prior to drying. When higher catalyst concentrations are employed in the Ziegler process, some of the metallic compounds may be removed from the polymeric product by extracting it with methanolic hydrochloric acid then washing it in methanol or acetone. Repeated washings in butanol are also frequently employed to decompose and remove the catalyst residue from the polymer product.

It has been observed that the presence of oxidative metallic catalytic residues in polymeric materials prepared according to the Ziegler process tends to impart certain undesirable characteristics to the polymers. Catalyst residues as substantial as 200 to 2000 p. p. m. by weight, depending upon the molecular weight of the polymer, may frequently be found contained in such polymer products even when they are purified by the usually employed aftertreating procedures. Polymers containing such concentrations of residues, when subsequently molded or otherwise shaped in the presence of heat, tend to become darker than is desirable due to the presence of the catalyst residue. This seriously restricts the utility of polymers prepared according to the Ziegler process. Furthermore, the presence of aluminum and other heavy metal compounds in polymers prepared according to the Ziegler process tends also to induce darkening on exposure to light, particularly daylight, in a manner which is analogous to the phenomenon which occurs in ceramic glazes when aluminum and other heavy metal compounds are present.

While antioxidants and like compounds may sometimes be employed to stabilize organic materials against the effects of degradation induced by exposure to light and heat, the efficacy of such materials is often greatly diminished or even nullified in the presence of metallic oxidation catalysts such as are found in the catalyst residues remaining in polymeric products prepared according to the Ziegler process.

It would be advantageous to treat polyethylene and other polymers prepared according to the Ziegler process in such a manner that their tendency to darken or degrade upon being shaped, molded or otherwise formed into structures, particularly when exposed to heat or upon exposure to light, would be lessened or, for all practical purposes, eliminated. If substantially all of the titanium and other heavy metal catalyst compounds were removed from such polymer products, they would display lessened propensities for oxidative degradation and would be less likely to darken in sunlight.

Therefore, it is among the objects of the present invention to treat polymerized olefinic and other ethylenically unsaturated materials, particularly polyethylene, which have been prepared with catalytic heavy-metal compounds in such a manner that they are stable to heat and light in the absence of stabilizers other than antioxidants. It is a further object of the present invention to treat such polymers to remove substantially all of the catalytic metallic residues so that a polymer product prepared in accordance with the Ziegler process but being substantially free from catalytic heavy metal residues may be obtained.

These and other related objects may advantageously be accomplished according to the present invention by first pretreating the catalyst residue containing polymerized olefinic and other ethylenically unsaturated compounds, particularly polyethylene, prepared according to the herein described Ziegler process, with a reagent material which renders the heavy metal constituents of the catalyst residue reactive with a fatty acid; then converting the pretreated heavy metal constituents to a soluble salt form with a fatty acid; and removing the solubilized heavy metal constituents from the polymer with a non-polar solvent for the heavy metal fatty acid salt.

Polymeric materials prepared according to the Ziegler process may be treated in accordance with the method of the present invention so as to have a catalyst residue finally remaining in the polymer in an amount which is less than about 25 and even less than about 20 p. p. m. by weight. Products so treated exhibit improved stability to light and heat. They have enhanced and more desirable color characteristics when employed for shaped and molded articles in comparison with polymers which are prepared using the conventionally practiced purifying aftertreatments following the Ziegler process.

Various pretreating reagent materials may be employed after polymerization to render the heavy metal constituents of the used catalyst residue in the polymer reactive with a fatty acid. These reagent materials include oxidizing agents and other compounds reducible by the heavy metal constituents in the used catalyst residue selected from the group consisting of alkoyl peroxides, aroyl peroxides, hydrogen chloride, hydrogen peroxide and chlorine. Alkoyl peroxides have been found particularly effective to pretreat catalyst residues containing titanium compounds which are frequently utilized to form the admixed catalysts employed in the Ziegler process. Lauroyl peroxide is especially effective for this purpose. Any desired fatty acid may be used to react with the pretreated heavy metal constituent to convert it to a soluble salt form including acetic acid, oleic acid, lauric acid, palmitic acid and the like. While fatty acids containing between 2 and about 30 carbon atoms in the molecule may be employed for this purpose, it is usually advantageous to employ those having between about 4 and 20 carbons. It is desirable for the fatty acids employed in the method of the present invention to be in a relatively pure condition.

Any suitable non-polar solvent may be employed to extract the solubilized heavy metal catalysts from the polymer product provided the fatty acid salt is soluble therein. Such non-polar saturated hydrocarbon solvents as benzene, toluene, butane, pentane, hexane, cyclohexane, and commercially available mixtures of saturated hydrocarbons and the like are in most instances well suited for this purpose.

The method of the present invention may be practiced under atmospheric pressure at temperatures between about 0° and 120° C. although temperatures between 60° C. and 100° C. may be advantageously employed. Usually the entire treatment is completed within about 4 hours, depending upon the reactivity of the particular pretreating reagent material and fatty acid employed on the heavy metal constituent.

Generally, a sufficient amount of pretreating reagent material is employed to insure that substantially all of the heavy metal constituent in the catalyst residue remaining in the polymer is rendered reactive with a fatty acid. The amount of fatty acid employed to solubilize the pretreated heavy metal constituent will vary with the concentration of catalyst residue to be found in the polymer. In order to insure a relatively rapid rate of reaction the amount of fatty acid employed should be appreciably in excess of stoichiometric requirements. For example, ratios of about at least one part by weight of the fatty acid to each ten parts by weight of the polymer may frequently be advantageously employed. And, in many instances, fatty acid to polymer ratios of 1:20 or more may be even more desirable.

The polymer product may often be conveniently treated according to the present invention while it is made up and held in a slurry with the non-polar solvent which is utilized for extracting the solubilized heavy metal constituent. After being treated, the polymer may be filtered, washed to remove the non-polar solvent containing the solubilized heavy metal constituent and dried. It is then in suitable condition to be subsequently shaped or otherwise fabricated to a desired form.

In order to further illustrate the invention but without being restricted thereto, the following examples are given:

*Example I*

Polyethylene was prepared according to the herein described Ziegler process by polymerizing relatively pure ethylene gas in the presence of an admixed aluminum triethyl and titanium tetrachloride catalyst. The polymerization reaction was conducted in a commercially available solvent, comprised of mixed saturated hydrocarbons boiling between about 168 and 210° C.

Part of the polyethylene product was treated repeatedly with butanol to remove the catalyst residue according to an aftertreating procedure conventionally employed in the Ziegler process. The polyethylene so treated was found to contain about 0.20 percent by weight of titanium compounds in the catalyst residue. When this polymer was molded it had a color rating of about 4 on an arbitrarily selected eight division color scale which proceeded through distinct shades of yellow and brown from a numerical rating of 1 for a very white polymer, comparable in color to the best and whitest commercially available polyethylene, to 8 for a very dark brown colored product. The samples for color evaluation were prepared by working the polymers on a roll mill at 170° C. for three minutes and then molding 0.070 inch thick specimens at 225° C.

In contrast, about 100 grams of the crude polyethylene product from the same batch was made up to an 800 ml. slurry with a commercially available solvent comprised of mixed saturated hydrocarbons boiling between about 168 and 210° C. to which about 1 gram of lauroyl peroxide was added. The mixture was agitated while its temperature was raised to about 80° C. At this point about 7 grams of lauric acid was added to the pretreated polymer. After about 2 hours of digestion at about 80° C., the solvent was removed by filtration. A new slurry of the polymer was prepared with an equal volume of fresh solvent to which about 4 grams of lauric acid was added. The new slurry was digested for about an additional 2 hour period at about 80° C. after which the treated polymer was filtered off and washed in benzene and acetone before being dried.

The polyethylene treated in accordance with the present invention contained only about 0.0020 percent by weight of titanium compound as a catalyst residue. The treated polymer, when molded, had a color rating of about 2.

*Example II*

A second batch of crude polyethylene was prepared by the Ziegler process according to the procedure of Example I. When part of the polymer was purified by butanol extraction it was found to contain about 0.19 percent by weight of titanium compound in the catalyst residue and to mold to a product having a color rating of 4.

In comparison, about 100 grams of the crude polyethylene product from the same batch was also made up to an 800 ml. slurry with benzene. The slurry was placed in a nitrogen purged one-liter vessel having an efficient agitating mechanism. Anhydrous hydrogen chloride was bubbled into the agitated slurry for about 10 minutes after which about 5 grams of lauric acid was added to the mixture which was digested at about 80° C. for about 2 hours. The solvent was removed from the digested slurry mixture and replaced with an equal volume of fresh solvent. The new slurry was agitated at about 80° C. for about 30 minutes. After this the purified polymer was filtered, washed several times in acetone and dried. The product molded white as indicated by a color rating of about 2. It contained only about 0.0021 percent by weight of titanium compound as catalyst residue.

Since certain changes and modifications in the practice of the present invention can readily be entered into without substantially departing from its spirit and scope, it is to be understood that all the foregoing descrpition be construed as being merely illustrative of the invention.

What is claimed is:

1. Method for removing heavy metal constituents in catalyst residues from polymerized ethylenically unsaturated materials prepared with a heavy metal catalyst formed by admixing a strong reducing agent with compounds of the group consisting of the group IV–B, V–B and VI–B metals of the periodic system and containing catalyst residues in which there are incorporated heavy metal constituents after having been polymerized which comprises first pretreating the heavy metal constituents of the catalyst residues in the polymerized product with greater than stoichiometric quantities of a reagent material which renders them reactive with a fatty acid; then converting the pretreated heavy metal constituents to a soluble salt form with greater than stoichiometric quantities of a fatty acid; and removing the solubilized heavy metal constituents from the polymerized product with a non-polar solvent for the heavy metal fatty acid salt.

2. Method for removing heavy metal constituents in catalyst residues from polymerized ethylenically unsaturated materials prepared with a heavy metal catalyst formed by admixing an aluminum alkyl with compounds of the group consisting of the group IV–B, V–B and VI–B metals of the periodic system and containing catalyst residues in which there are incorporated heavy metal constituents after having been polymerized which comprises first pretreating the heavy metal constituents of the catalyst residues in the polymerized product with greater than stoichiometric quantities of a reagent material selected from the group consisting of alkoyl peroxides, aroyl peroxides, hydrogen chloride, hydrogen peroxide and chlorine; then converting the pretreated heavy metal constituents to a soluble salt form with greater than stoichiometric quantities of a fatty acid having between 2 and about 30 carbon atoms in its molecule; and removing the solubilized heavy metal constituents from the polymerized product with a non-polar solvent for the heavy metal fatty acid salt.

3. Method for removing heavy metal constituents in catalyst residues from polymerized ethylenically unsaturated materials prepared with a heavy metal catalyst formed by admixing an aluminum alkyl with compounds of the group consisting of the group IV–B, V–B and VI–B metals of the periodic system and containing catalyst residues in which there are incorporated heavy metal constituents after having been polymerized which comprises first pretreating the heavy metal constituents of the catalyst residues in the polymerized product at a temperature between about 0° C. and about 100° C. with greater than stoichiometric quantities of a reagent material selected from the group consisting of alkoyl peroxides, aroyl peroxides, hydrogen chloride, hydrogen peroxide and chlorine; then converting the pretreated heavy metal constituents to a soluble salt form with greater than stoichiometric quantities of a fatty acid having between 2 and about 30 carbon atoms in its molecule; and removing the solubilized heavy metal constituents from the polymerized product with a non-polar solvent for the heavy metal fatty acid salt.

4. The method of claim 3 wherein the reagent material is lauroyl peroxide.

5. The method of claim 3 wherein the reagent material is hydrogen chloride.

6. The method of claim 3 wherein the fatty acid contains between about 4 and 20 carbon atoms in its molecule.

7. The method of claim 3 wherein the fatty acid is lauric acid.

8. The method of claim 3 wherein the non-polar solvent is a saturated hydrocarbon material.

9. The method of claim 3 wherein the polyethylene is prepared in the presence of a catalyst formed by admixing an aluminum alkyl with a titanium salt.

10. Method for removing titanium containing constituents in catalyst residues from polyethylene prepared with a catalyst formed by admixing an aluminum alkyl with a titanium compound and containing catalyst residues in which there are incorporated heavy metal constituents after having been polymerized which comprises first pretreating the titanium containing constituents in the polyethylene product at a temperature between about 0° C. and about 100° C. with greater than stoichiometric quantities of a reagent material selected from the group consisting of alkoyl peroxides, aroyl peroxides, hydrogen chloride, hydrogen peroxide and chlorine; then converting the pretreated titanium containing constituents to a soluble salt form with greater than stoichiometric quantities of a fatty acid having between about 4 and 20 carbon atoms in its molecule, and removing all of the solubilized titanium containing constituents in excess of about 25 p. p. m. by weight from the polyethylene product with a non-polar solvent for the solubilized titanium containing constituents.

11. In the method of claim 10 wherein the reagent material is lauroyl peroxide.

12. The method of claim 10 wherein the reagent material is hydrogen chloride.

13. The method of claim 10 wherein the fatty acid is lauric acid.

14. The method of claim 10 wherein all of the solubilized titanium containing constituents in excess of about 20 p. p. m. by weight are removed from the polyethylene product with the non-polar solvent.

References Cited in the file of this patent

UNITED STATES PATENTS 2,209,746    Ebert et al. _____ July 30, 1940

FOREIGN PATENTS 533,362    Belgium _____ May 16, 1955